United States Patent [19]
Kawahara et al.

[11] Patent Number: 5,733,222
[45] Date of Patent: Mar. 31, 1998

[54] POWER TRANSMISSION APPARATUS

[75] Inventors: Eiichiro Kawahara; Tetsuo Naraki, both of Wako, Japan

[73] Assignee: Honda Giken Kogyo Kabushiki Kaisha, Tokyo, Japan

[21] Appl. No.: 655,776

[22] Filed: May 31, 1996

[30] Foreign Application Priority Data

Jun. 2, 1995 [JP] Japan .................................. 7-158757
Jun. 12, 1995 [JP] Japan .................................. 7-167839

[51] Int. Cl.$^6$ .............................. F16D 37/02; F16H 1/28
[52] U.S. Cl. ............................................... 477/154
[58] Field of Search ............................ 475/149, 154

[56] References Cited

U.S. PATENT DOCUMENTS

| | | | |
|---|---|---|---|
| 2,709,928 | 6/1955 | Jones | 475/154 |
| 3,008,352 | 11/1961 | Peras | 475/154 |
| 3,077,121 | 2/1963 | Schaub | 475/154 |
| 3,209,620 | 10/1965 | Moan | 475/154 |

FOREIGN PATENT DOCUMENTS

| | | |
|---|---|---|
| 60-132133 | 7/1985 | Japan . |
| 61-266836 | 11/1986 | Japan . |

*Primary Examiner*—Dirk Wright
*Attorney, Agent, or Firm*—Nikaido, Marmelstein, Murray & Oram LLP

[57] ABSTRACT

The apparatus comprises a planetary gear device and a magnetic particle type electromagnet clutch. The planetary gear device has a gear element connected to an input member, another gear element connected to an output member and a remaining other gear element. The electromagnetic clutch has a fixed member provided with a exciting coil and a rotary member adapted to be fixed to the fixed member by controlling intensity of electric current in the exciting coil. The rotary member is connected to the remaining other gear element.

Further, the electromagnetic clutch comprises a fixed outer member having side walls opposite to each other and a circumferential wall, a rotary inner member provided inside of the outer member rotatably relative to the outer member, electromagnetic powders interposed between the outer and inner members and magnetized by excitation of the exciting coil to form a linkage for connecting the outer and inner members, a ring-shaped electromagnetic powder chamber provided along at least one of the inner surface of the side wall of the outer member and a side surface of the inner member and opened radially outwardly, and a plurality of partition walls circumferentially dividing the electromagnetic powder chamber into a plurality of small chambers.

4 Claims, 9 Drawing Sheets

POWER TRANSMISSION APPARATUS

BACKGROUND OF THE INVENTION

The present invention relates to a power transmission apparatus having a magnetic particle type electromagnetic clutch in which a connecting function is carried out by magnetizing electromagnetic powder.

The magnetic particle type electromagnetic clutch has an exciting coil in either Side of an outer member and an inner member which rotate relatively. When the exciting coil is charged with electricity to produce a magnetic field, magnetic particles in electromagnetic powder interposed between the outer and inner members are magnetized and a linkage of the magnetic particles is formed for transmitting a torque. Intensity of the magnetic field can be varied for controlling the transmitted torque by adjusting electric current supplied to the exciting coil and smooth and quick connecting and disconnecting are possible.

In the customary power transmission apparatus using such a magnetic particle type electromagnetic clutch, it has been common that both the outer and inner members of the magnetic particle type electromagnetic clutch rotate to transmit rotational torque of one member to the other member.

Figure 15:
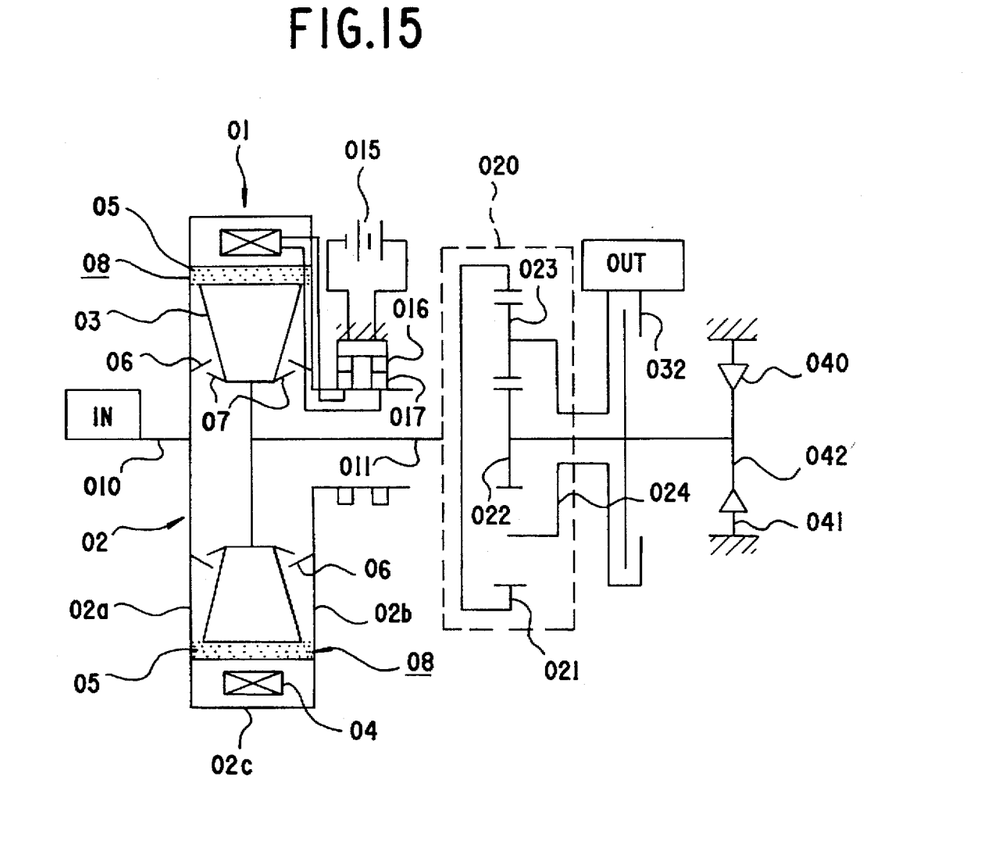
FIG. 15 is a schematic constitutional view of a customary transmission apparatus.
Figure 16:
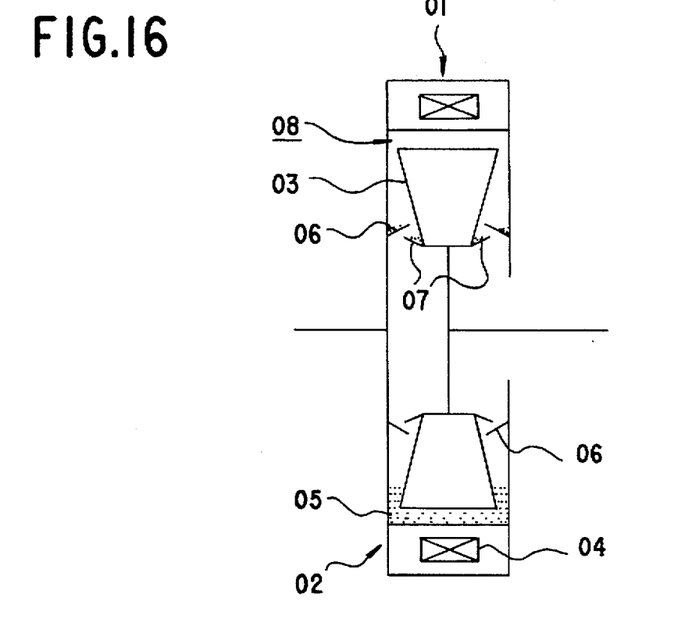
FIG. 16 is a schematic constitutional view of a magnetic particle type electromagnetic clutch in the customary transmission apparatus which is in a stopped state.
Figure 17:
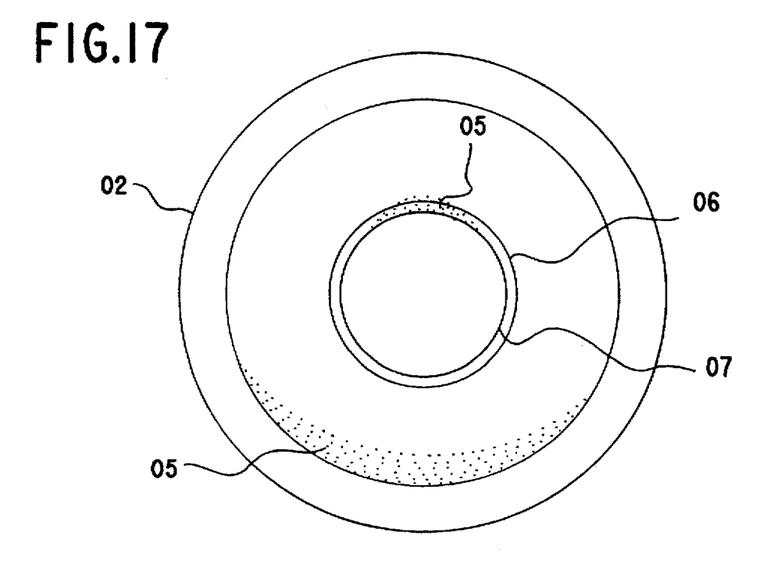
FIG. 17 is a front view of FIG. 16.

FIGS. 15 to 17 show an example of a customary variable-sped apparatus of the kind. The reference numeral 01 denotes a magnetic particle type electromagnetic clutch which comprises an outer member 02 having side walls 02a, 02b facing each other and a circumferential wall 02c, and an inner member 03 arranged within the outer member 02 rotatably relative thereto. An exciting coil 04 is housed within the circumferential wall 02c of the outer member 02 and electromagnetic powder 05 is interposed between the outer and inner members 02, 03.

On the side walls 02a, 02b of the outer member 02 and on side surfaces of the inner member 03 opposite to the side walls 02a, 02b are projected tapering and ring-shaped obstruction plates 06, 07. Each of the obstruction plates 06, 07 forms a ring-shaped chamber opened radially outwardly. When the rotations of the outer and inner elements are stopped, the electromagnetic powder falling toward the center region is received by the upper sides of the obstruction plates 06, 07 and guided to fall toward both sides so that the electromagnetic powder is prevented from entering into the center region.

An input shaft 010 is integrally connected with the outer member 02 and a rotor 011 integrally connected with the inner member 03 is connected to a ring gear 021 of a planetary gear device 020. A sun gear 022 of the planetary gear device 02 is connected to a rotary member 031 of a hydraulic clutch 030 and a rotary member 042 of an one-way clutch 040. The other member 041 of the one-way clutch 040 is fixed. A carrier 024 of a planetary gear 023 which is a remaining member of the planetary gear device 020 is integrally connected to the other rotary member 032 of the hydraulic clutch. The rotary member 032 is the output.

In the variable-speed device constituted as described above, since both the outer member 02 and the inner member 03 of the magnetic particle type electromagnetic clutch 01 rotate, a slip ring 017 is provided on the rotary outer member 02 to supply electricity to the exciting coil 04 housed in the outer member 02 from the exterior and a brush 016 connected to a stationary electric source 015 comes in contact with the slip ring 017 to form an electric passage. When the exciting coil 04 housed in the outer member 02 is electrified in such a manner, a magnetic field is produced to magnetize the magnetic particle of the electromagnetic powder 05 and the magnetized particles are connected with each other in a shape of chain themselves as well as connect the outer member 02 and the inner member 03 in a tight connection state. When the electric current of the exciting coil 04 is cut off, the magnetic particles are demagnetized and the tight connection is perfectly released.

Therefore, in case that the exciting coil 04 of the magnetic particle type electromagnetic clutch 01 is not electrified and the tight connection is released, the rotary power of the input shaft 01 makes only the outer member 02 of the magnetic particle type electromagnetic clutch 01 run idle and the variable-speed apparatus is in the neutral state. In case that the exciting coil 04 of the magnetic particle type electromagnetic clutch 01 is electrified and the clutch is in the tight connection state, the rotary power of the input shaft 010 is transmitted from the outer member 02 to the inner member 03 and further the ring gear 021 of the planetary gear device 020 is rotated through the rotor 011 by the rotary power.

At that time, if the hydraulic clutch is in a tight connection released state, the planetary gear 023 can rotate freely relative to the sun gear 022 and revolves round the sun gear 022 which is prohibited from rotating in a direction by the one-way clutch 044, while rotating on its own axis with rotation of the ring gear 021, for making the carrier 024 rotate at a reduced speed. As the carrier 024 corresponds to the output of the variable-speed apparatus, the apparatus is in the low speed rotation state.

When the magnetic particle type electromagnetic clutch 01 is in the tight connection state and the hydraulic clutch 030 is also in its tight connection state, the sun gear 022 and the planetary gear 023 are connected in one body and the planetary gear 023, the sun gear 022 and the ring gear 021 rotate in one body on rotation of the ring gear 021. That is, the input shaft 010 rotationally drives the rotor 011 through the magnetic particle type electromagnetic clutch 01, the rotor 011 rotates the whole planetary gear device in one body and the output of the carrier 023 becomes a high speed rotation state.

As described above, the variable-speed apparatus can be set in two stages of variable-speed, low-speed and high-speed, beside the neutral stage.

In the customary magnetic particle type electromagnetic clutch 01, since the outer member 02 integrally connected to the input shaft 010 is used as the driving side and the inner member 03 as the driven side, the exciting coil 04 housed in the outer member 02 also rotates and therefore a special electric contact members such as the brush 016 and the slip ring 017 are necessary for supplying electricity to the exciting coil 04. Even if the exciting coil 04 is provided on the inner member 03 side, the exciting coil rotates likewise and the special electric contact members are required for electricity supply.

Accordingly, a space for arranging the brush 016 is necessary. In addition, there are many inconveniences such that abrasion powder takes place owing to mechanical contact of the brush 016 and the slip ring 017 to cause contamination, electric resistance is changed owing to change of pressing force of the brush 016 to make an accurate exciting control of the exciting coil impossible, and parts exchange is necessary because lives of the parts are shortened by the abrasion. Further, there are fears that oil adheres to the contact surfaces of the brush 016 and the slip ring 017 or the brush 016 jumps to cause an inferior contact and injure the reliability.

The sliding contact part is made of a conductive material having a low electric resistance. It is desirable that the material has a superior abrasion-resistant character, but at the beginning the surface of the material must be maintained in a desired condition by that the surface is worn moderately, therefore the applicable material is limited. In addition, since the positive pole and the negative pole neighbor closely, a non-conductive partition is necessary in order to prevent a short circuit. Further, the sliding contact part must be constructed so as not to come in contact with water or oil easily. And all those facts result in high cost.

Besides aforementioned problems, there is one more problem caused by distribution of the electromagnetic powder 05.

Normally, the magnetic particle type electromagnetic clutch 01 is used with the rotor 011 directed horizontally. When the outer element 02 rotates, the electromagnetic powders 05 gather at the gap 08 between the inner surface of the circumferential wall 02a of the outer member 02 and the outer peripheral surface of the inner member 03 and the neighborhood by centrifugal force and acts as a sliding member between the outer and inner members 02, 03.

However, if the exciting coil 04 is electrified, a magnetic field takes place around the exciting coil 04, the magnetic particles of the electromagnetic powders 05 are magnetized, the electromagnetic powders in the neighborhood of the gap 08 also moves to the gap 08 and the electromagnetic powders 05 are connected to each other in a shape of chain so that the torque is transmitted to the driven member 03 through the electromagnetic powder 05. This connecting force that is the transmitted torque is proportional to the intensity of the current flowing in the exciting coil 04 and disappears perfectly when the current is cut off.

When the electromagnetic clutch 01 stops the operation, the exciting coil 04 is demagnetized and the outer member 02 stops the rotation, the electromagnetic powders 05 come down by the gravity. At this time, the electromagnetic powders 05 above the obstruction plates 06, 07 are received by the upper half portion of the plates 06, 07 and guided toward both sides to further come down so that the electromagnetic powders are prevented from entering into the center region of the clutch 01.

FIGS. 17 and 18 show a state of distribution of the electromagnetic powders 05 which have come down and is settled. Almost all of the electromagnetic powders 05 is partially accumulated on a lower inner circumferential part of the circumferential wall 02a of the outer member 02 and a slight part of the electromagnetic powders 05 is caught and held on a upper portion of the obstruction plates 06, 07.

Therefore, inconveniences such that the accumulated electromagnetic powders 05 resist the starting, the rotation is ill-balanced and a required torque transmission cannot be obtained are inevitable.

Japanese Patent Laid-Open Publication No. Sho 60-132133 discloses an example of the magnetic particle type electromagnetic clutch having the exciting coil 04 on the outer element 02 side as described above, while Japanese Patent Laid-Open Publication No. Sho 61-266836 discloses another example having the exciting coil on the inner member side. In case of the latter too, there is provided merely obstruction plates similar to those of the former so that the partial accumulation of the electromagnetic powders on the lower part of the outer member is inevitable when the driving is stopped.

Since each outer member 02 of the both examples is a drive member and rotates, the aforementioned problems occurs on starting and once it is rotationally driven the electromagnetic powders 05 are uniformly distributed in the gap 08 portion between the inner surface of the circumferential wall 02a of the outer member 02 and the outer circumferential surface of the inner member 03 by the centrifugal force as shown in FIG. 15. However, in case of a fixed type electromagnetic clutch in which the outer member is fixed so as not to rotate, the centrifugal force cannot be expected so much and once the electromagnetic powders 05 are partially accumulated on the lower portion of the outer member as shown in FIGS. 16 and 17 when the clutch is stopped, the partial distribution of the electromagnetic powders 05 hardly disappears even during drive and required torque transmission cannot be realized sometimes.

The present invention is accomplished in view of the above-mentioned points and an object of the present invention is to provide a power transmission apparatus of high reliability and low cost having a magnetic particle type electromagnetic clutch in which a side provided with an exciting coil is formed as a stationary body to eliminate necessity of a special electric contact member for supplying electricity to the exciting coil and inconvenience caused by abrasion.

Another object of the present invention is to provide a magnetic particle type electromagnetic clutch in which partial distribution of the electromagnetic powders at a stop of operation can be avoided as possible, a smooth starting and a rotational balance can be maintained easily, and a required torque transmission can be obtained.

SUMMARY OF THE INVENTION

In order to attain the above objects, according to the present invention, there is provided a power transmission apparatus, comprising a planetary gear device having a first gear element connected to an input member for inputting a rotational driving force, a second gear element connected to an output member and a third gear element, and an electromagnetic clutch having a fixed member including an exciting coil, a rotary member connected to the third gear element and a control means controlling electric energy provided to the exciting coil, wherein the rotary member is adapted to be fixed to the fixed member.

When the exciting coil provided in the fixed member of the electromagnetic clutch is not electrified, the third gear element of the planetary gear device connected to the rotary member can rotate freely and rotation of the first gear element connected to the input member is not transmitted to the second gear element through the freely rotatable gear element. When the exciting coil is electrified, the rotary member of the magnetic particle type electromagnetic clutch is tightly connected to the fixed member by magnetization of the electromagnetic powders, the third gear element connected to the rotary member is fixed, and rotation of the gear element connected to the input member is transmitted to the another gear element.

As the exciting coil is provided in the fixed element, an electric contact member such as a slip ring is not required in a electric passage for supplying electric power to the exciting coil to eliminate inconveniences owing to abrasion and a power transmission apparatus of small-size, low-cost and superior reliability and durability can be obtained.

If a clutch means for engaging any two gear element of the planetary gear device is provided, when the electromagnetic clutch is in a tight connection state, the output state can be changed in two stages of low speed and high speed in accordance with engaging and disengaging of the clutch means.

If the third gear element of the planetary gear device is connected to the rotary member of the electromagnetic clutch through an one-way clutch, a smooth power transmission is possible without a cooperative control of the electromagnetic clutch and the clutch means.

The electromagnetic clutch may comprise, an outer member having side walls opposite to each other and a circumferential wall covering a periphery of the side walls, and forming the above-mentioned fixed member; an inner member rotating inside of the outer member relative to the outer member and forming the above-mentioned rotary member; electromagnetic powders interposed between the outer ember and the inner member and magnetized by excitation of the exciting coil to form a linkage for connecting the outer member and the inner member; a ring-shaped electromagnetic powder receiving chamber disposed on an inner surface of the side wall of the outer member or a side surface of the inner member and having radially outward opening, and a plurality of partition walls circumferentially dividing the electromagnetic powder receiving chamber into a plurality of small chambers.

Since the electromagnetic powder receiving chamber is divided into a plurality of small chambers, when excitation of the exciting coil is released and driving is stopped, coming down of the electromagnetic powder which has been positioned at an upper position is stopped by the small chamber with the opening directed upwardly and the powder is held in the small chamber by the partition wall. Thus, entrance of the electromagnetic powder into the center region is prevented and the partial accumulation on the lower position of the circumferential wall is also prevented as possible.

If a magnetizing member having a magnetic force weaker than that of the exciting coil is arranged circumferentially on the outer member or the inner member, when excitation of the exciting coil is released and driving is stopped, the magnetizing member arranged circumferentially attracts and holds the electromagnetic powder to prevent the coming down of the powder to some extent and the partial accumulation on the lower portion of the circumferential wall is prevented as possible. Because the magnetic force of the magnetizing member is weaker than that of the exciting coil, control of torque transmission by the exciting coil is not influenced by the magnetizing member almost.

If an electromagnet is arranged circumferentially on the outer member or the inner member and an electromagnet demagnetizing means for demagnetizing the electromagnet when the exciting coil is electrified is provided, when excitation of the exciting coil is released and driving is stopped, the electromagnetic powder can be attracted and held by the electromagnet by exciting the electromagnet to prevent the coming down of the powder to some extend and the partial accumulation on the lower portion of the circumferential wall is prevented as possible. It is to be noted that the electromagnet is demagnetized when the exciting coil is electrified so that control of torque transmission by the exciting coil is not influenced.

DETAILED DESCRIPTION OF THE PREFERRED EMBODIMENT

Figure 1:
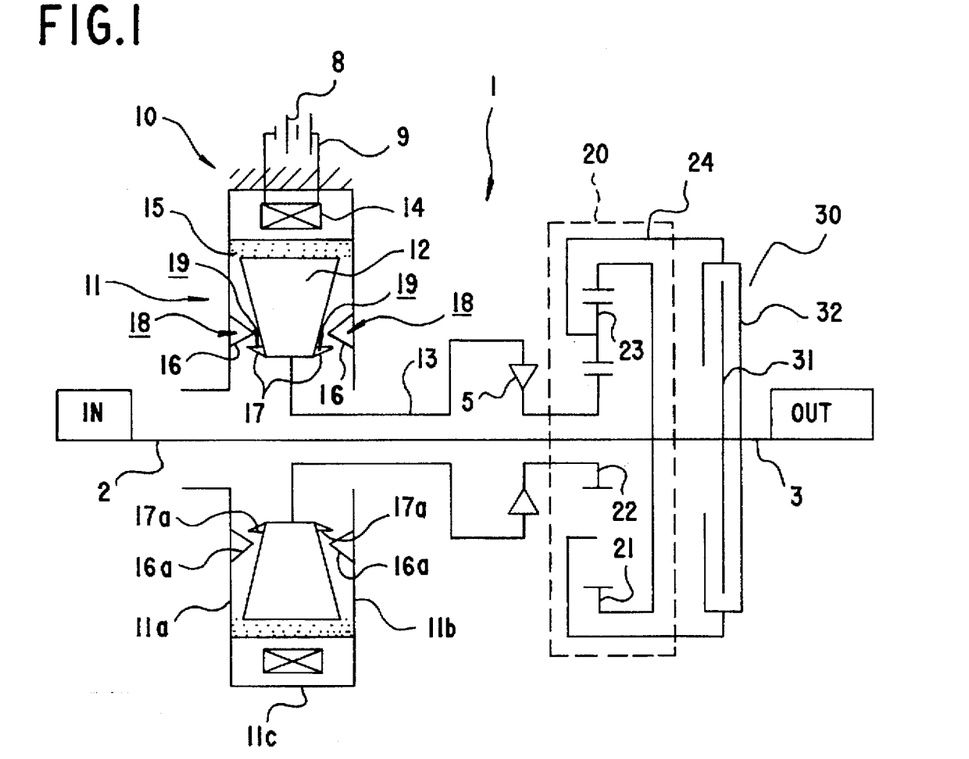
FIG. 1 is a schematic constitutional view of a transmission apparatus relating to the first embodiment of the invention.

Hereinafter, the first embodiment of the present invention will be described with reference to FIGS. 1 to 3. This first embodiment is a two-stages variable-speed apparatus 1 in which a magnetic particle type electromagnetic clutch 10, a planetary gear device 20 and a hydraulic clutch 30 are combined.

The magnetic particle type electromagnetic clutch 10 comprises a fixed stationary outer member 11 and an inner member 12 arranged inside of the outer member 11. The outer member 11 and the inner member 12 are coaxial and rotate relative to each other. The outer member 11 is formed by disk-shaped side walls 11a, 11b opposite to each other and a flat cylindrical circumferential wall 11c connecting outer peripheral portions of the side walls 11a, 11b. The inner member 12 is fixedly fitted to a rotor 13.

An exciting coil 14 wound in a circumferential direction is housed in the circumferential wall 11c of the outer member 11.

Electromagnetic powders 15 are interposed in gaps formed between the outer member 11 and the inner member 12.

On surfaces of the side walls 11a, 11b of the outer member 11 and surfaces of the both sides of the inner member 12 opposite to each other are projected tapering ring-shaped obstruction plates 16, 17 respectively being opened toward radially outward direction to form ring-shaped electromagnetic powder chambers. Each of the ring-shaped chambers is divided into plurality of small chambers 18, 19 by partition walls 16a, 17a arranged circumferentially at regular intervals (see FIG. 3).

The exciting coil 14 on the stationary side is supplied with electric power from an electric source 8 through electric lines 9.

The planetary gear device 20 has a ring gear 21 integrally connected to an input shaft 2 as well as a rotary member 31 of a hydraulic clutch 30, a sun gear 22 connected to the rotor 13 of the magnetic particle type electromagnetic clutch 10 through an one-way clutch 5, and a planetary gear 23 connected to another rotary member 32 of the hydraulic clutch 30 through a carrier 24. The rotary member 32 is integrally connected to an output shaft 3.

When both of the magnetic particle type electromagnetic clutch 10 and the hydraulic clutch 30 are in tight connection release states, the inner member 12 of the magnetic particle type electromagnetic clutch 10 can rotate freely and the sun gear 22 connected to the inner member 12 also can rotate freely. Rotation of the ring gear 21 caused by rotational power of the input shaft 2 is transmitted to the freely rotatable sun gear 22 through the planetary gear 23 with no load, and the sun gear 22 runs idle in reverse together with the rotor 13 connected to it through the one-way clutch 5. The planetary gear 23 rotates on its axis but does not revolve round the sun gear 22 so that no power is transmitted to the carrier 24, the rotary member 32 of the hydraulic clutch 30 and the output shaft 3 and the apparatus is in a neutral state.

At this time, if the exciting coil 14 of the magnetic particle type electromagnetic clutch 10 is electrified, a magnetic field takes place and the magnetic particles of the electromagnetic powder 15 are magnetized to form a linkage for connecting the inner member 12 with the stationary outer member 11. As the result, the inner member 12 is fixed together with the rotor 13 to prohibit the reverse rotation of the sun gear 22 through the one-way clutch 5. And between the sun gear prohibited from the reverse rotation and the ring gear 21 rotating by the rotational power of the input shaft 2, the planetary gear 23 revolves round the sun gear 22 while rotating on its own axis to rotate the carrier 24, the rotary member 32 of the hydraulic clutch 30 and the output shaft 3 at a low speed.

If also the hydraulic clutch 30 is tightly connected, the ring gear 21 and the carrier 24 are integrally connected and the whole planetary gear device 20 can rotate as one body, because the normal rotation of the sun gear 22 is not prohibited by the one-way clutch 5. Namely, the input shaft 2 is directly connected to the output shaft 3 for rotating the output shaft 3 at a high speed.

As mentioned above, according to the first embodiment, two stages of variable-speed states, high and low, can be obtained besides the neutral state. Shifting from the neutral state to the low speed or the high speed rotation state can be carried out quickly and smoothly using the magnetic particle type electromagnetic clutch 10.

Since the exciting coil 14 is arranged on the outer member 11 fixed in a stationary state, electric power is supplied from the electric source 8 directly to the exciting coil 14 by the electric line 9 and an electric contact part contacting slidable such as a slip ring and a brush is not required in the middle of the electric line 9. Therefore, there is no fear such as abrasion or bad contact of the electric contact part, superior durability and reliability can be obtained, space for the electric contact part is unnecessary, miniaturization is possible and the cost can be suppressed low.

In addition, since the outer member 11 is fixed so as not to rotate and requires no mechanical rotational strength, a large lightening of the outer member 11 can be achieved.

Although the one-way clutch 5 is interposed between the rotor 13 and the sun gear 22 in the first embodiment, the one-way clutch 5 is not always necessary.

Namely, even if the rotor 13 and the sun gear 22 are directly connected, on shifting to the high speed rotation state, the output shaft 3 can be set at the high speed rotation state by changing the magnetic particle type electromagnetic clutch 10 to the tight connection release state simultaneously with changing the hydraulic clutch 30 to the tight connection state. The role of the one-way clutch 5 in the first embodiment is now done by the magnetic particle type electromagnetic clutch 10 and the planetary gear device 20, the hydraulic clutch 30 and the inner member 12 of the magnetic particle type electromagnetic clutch 10 are rotated as one body at the high speed by the rotational power of the input shaft 2. In case of shifting from the high speed to the low speed, the magnetic particle type electromagnetic clutch 10 and the hydraulic clutch 30 are changed respectively on the opposite side to the above simultaneously. In the case that the one-way clutch 5 is not provided, the magnetic particle type electromagnetic clutch 10 and the hydraulic clutch 30 have to be changed simultaneously on changing speed as mentioned above, that is, a cooperative control of the clutches 10, 30 is necessary.

When the exciting coil 14 is electrified, a magnetic field takes place round the exciting coil 14 and the electromagnetic powders 15 are gathered on the inner periphery of the circumferential wall 11c of the outer member 11. Magnetic particles of the gathered powders 15 are magnetized, further attracted in the gap between the inner periphery of the wall 11c and the outer peripheral surface of the inner member 12 and connected with each other like a chain to connect the inner member 12 with the outer member 11. Therefore, during operation of the electromagnetic clutch 10, the electromagnetic powders 15 distributes uniformly along the whole circumference of the gap between the inner circumferential surface of the outer member 11 and the outer circumferential surface of the inner member 12.

If the electrification of the exciting coil is stopped to release the excitation and rotation of the inner member 12 is also stopped, the electromagnetic powders 15 positioned above come down by gravity. The electromagnetic powders 15 positioned above the center region come down to enter the small chambers 18, 19 at an upper half portion of the electromagnetic chamber opening upward and are held by the partition walls 16a, 17a so as not to further come down. Thus, intrusion of the electromagnetic powder 15 into the center region is prevented.

Figure 2:
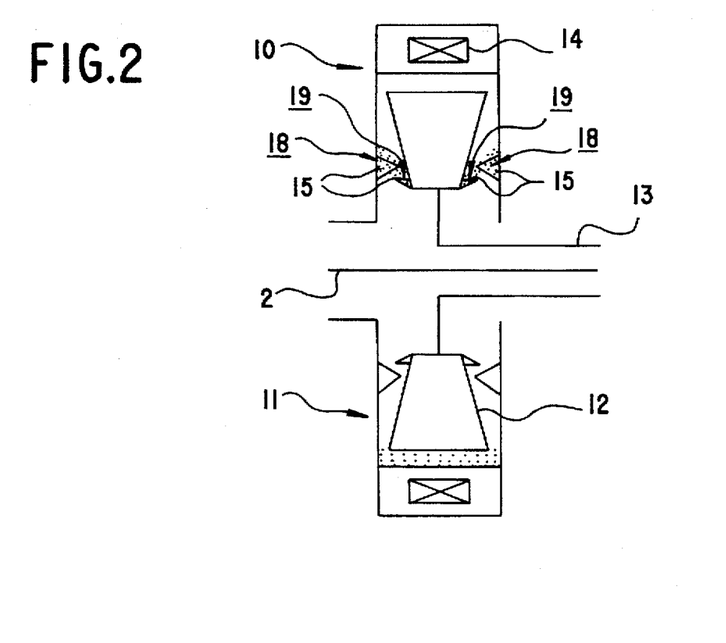
FIG. 2 is a schematic constitutional view of a magnetic particle type electromagnetic clutch in the transmission apparatus which is in a stopped state.
Figure 3:
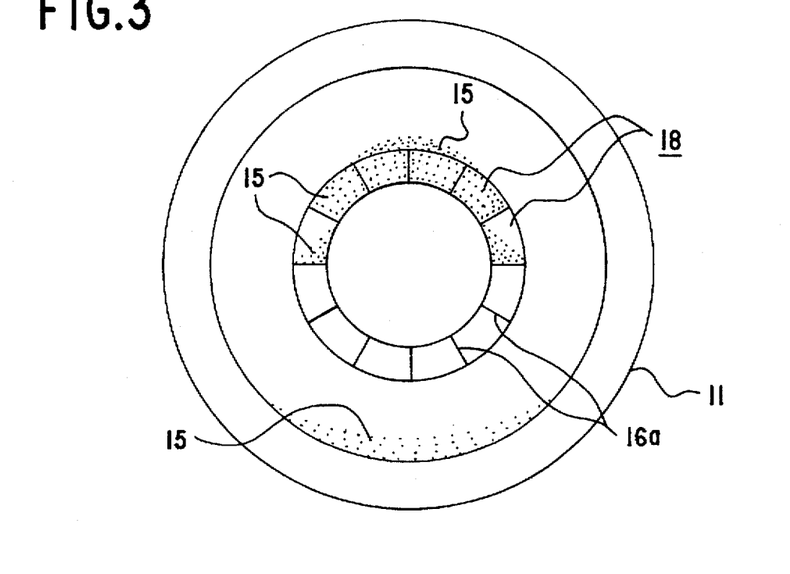
FIG. 3 is a front view of the clutch of FIG. 2.

Distribution of the electromagnetic powders 15 at the time when the exciting coil 14 is not excited is separated into two parts of the electromagnetic powders 15 gathered on the bottom portion of the circumferential wall 11c of the outer member 11 and the electromagnetic powders 15 held in the small chambers 18, 19 at the upper half, as shown in FIGS. 2 and 3, and it can be prevented that almost all of the electromagnetic powders are gathered on a bottom of the circumferential wall as ever.

Since an excessive amount of the electromagnetic powders 15 are not accumulated on the bottom portion of the circumferential wall 11c, when the inner member 12 rotates, the electromagnetic powders 15 maintain its sliding function and do not resist the rotation of the inner member 12. Therefor, the inner member 12 can rotate smoothly, the rotation balance is maintained easily and a required torque transmission control can be carried out accurately. It has a simple construction that the ring-shaped electromagnetic powder chamber is divided into the small chambers 18, 19 by the partition walls 16a, 17a so that the cost is low.

The above-mentioned magnetic particle type electromagnetic clutch 10 is used as a fixed type electromagnetic clutch with the outer member 11 fixed, that is, as an electromagnetic brake. However, the way of dividing the ring-shaped electromagnetic powder chamber into the small chambers by the partition walls is applicable for a torque transmission system having an outer member rotating itself.

In the first embodiment, the ring gear 20 of the planetary gear device 20 is connected to the input shaft 2, the sun gear 22 to the rotor 13 through the one-way clutch 5 and the carrier 24 for revolution of the planetary gear 23 to the output shaft 3. However, each of three elements of the input shaft 2, the output shaft 3 and the rotor 13 can be combined and connected with any of three elements of the ring gear 21, the sun gear 22 and the carrier 24, and therefor six kinds of combinations are possible including the above-mentioned constitution.

As for the variable-speed apparatus, the hydraulic clutch can be interposed between any two elements among the three elements of the ring gear 21, the sun gear 22 and the carrier 24 of the planetary gear device 20. The planetary gear device 20 rotates in one body as a whole in the tight connection state of the hydraulic clutch and acts as a proper planetary gear device in the tight connection release state of the hydraulic clutch.

Hereinafter, five constitutions other than that of the first embodiment will be described with reference to FIGS. 4 to 8 in which the hydraulic clutch is omitted and the same members are denoted by the same symbols.

Figure 4:
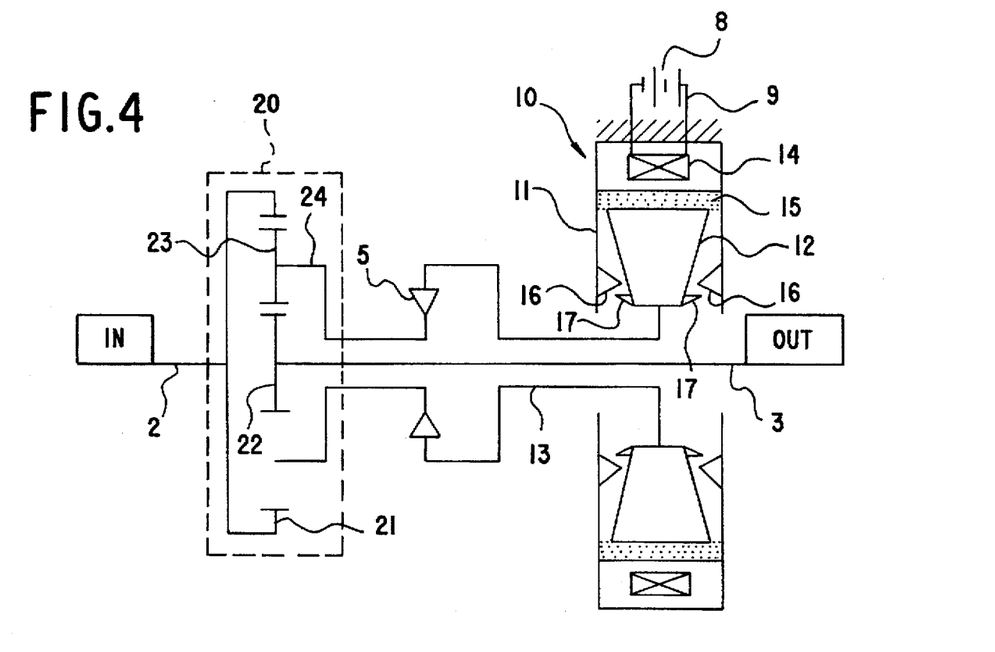
FIG. 4 is a schematic constitutional view of a transmission apparatus according to the second embodiment of the invention.

In the second embodiments shown in FIG. 4, the ring gear 21 and the sun gear 22 are connected to the input and the output respectively, and the carrier 24 is connected to the rotor 13 through the one-way clutch 5. If the magnetic particle type electromagnetic clutch 10 and the hydraulic clutch have been released from the tight connection, the carrier 24 can rotate freely, rotation of the ring gear 21 is not transmitted to the sun gear 22 and the apparatus is in the neutral state. Then if the magnetic particle type electromagnetic clutch 10 tight-connects, the carrier 24 is prohibited from the reverse rotation and rotation of the ring gear 21 is transmitted to the sun gear 22 through the planetary gear 23 at an increased speed to bring about the high speed rotation state. And then if the hydraulic clutch tight-connects, the whole planetary gear device 20 rotates in one body to bring about the low speed rotation state wherein the input and output speeds are the same.

Figure 5:
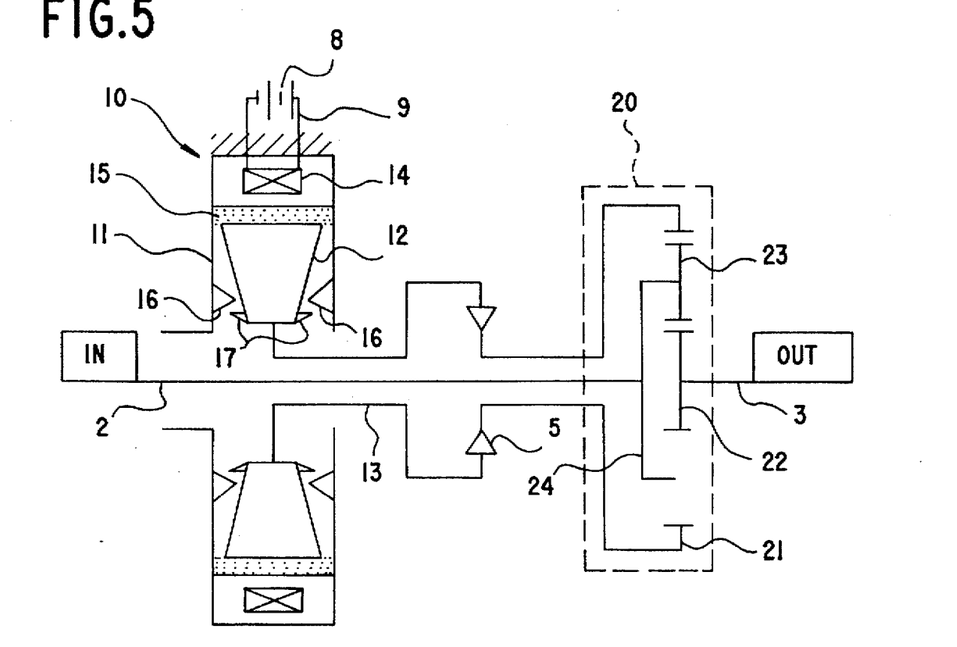
FIG. 5 is a schematic constitutional view of a transmission apparatus according to the third embodiment of the invention.

In the third embodiment shown in FIG. 5, the carrier 24 and the sun gear 22 are connected to the input and the output respectively, and the ring gear 21 is connected to the rotor 13 through the one-way clutch 5. If the magnetic particle type electromagnetic clutch 10 and the hydraulic clutch have been released from the tight connection, the ring gear 21 can rotate freely, the carrier 24 runs idle with the ring gear 21 rotated in reverse, rotation of the carrier 24 is not transmitted to the sun gear 22 and the apparatus is in the neutral state. Then if the magnetic particle type electromagnetic clutch 10 tight-connects, the ring gear 21 is prohibited from the reverse rotation and rotation of the carrier 24 is transmitted to the sun gear 22 at an increased speed to bring about the high speed rotation state. And then if the hydraulic clutch tight-connects, the whole planetary gear device 20 rotates in one body to bring about the low speed rotation state wherein the input and output speeds are the same.

Figure 6:
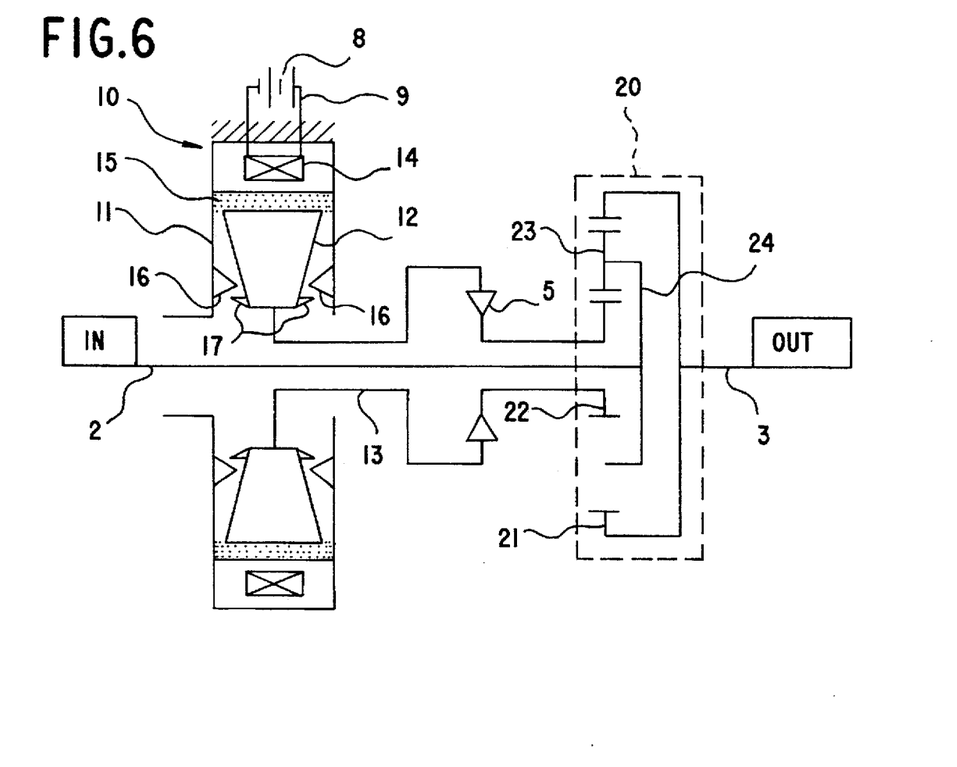
FIG. 6 is a schematic constitutional view of a transmission apparatus according to the fourth embodiment of the invention.

In the fourth embodiment shown in FIG. 6, the carrier 24 and the ring gear 21 are connected to the input and the output respectively, and the sun gear 22 is connected to the rotor 13 through the one-way clutch 5. If the magnetic particle type electromagnetic clutch 10 and the hydraulic clutch have been released from the tight connection, the sun gear 22 can rotate freely, rotation of the carrier 24 is not transmitted to the ring gear 21 because the sun gear 22 runs idle and the apparatus is in the neutral state. Then if the magnetic particle type electromagnetic clutch 10 tight-connects, the sun gear 22 is prohibited from the reverse rotation and rotation of the carrier 24 is transmitted to the ring gear 22 at an increased speed to bring about the high speed rotation state. And then if the hydraulic clutch tight-connects, the whole planetary gear device 20 rotates in one body to bring about the low speed rotation state wherein the input and output speeds are the same.

Figure 7:
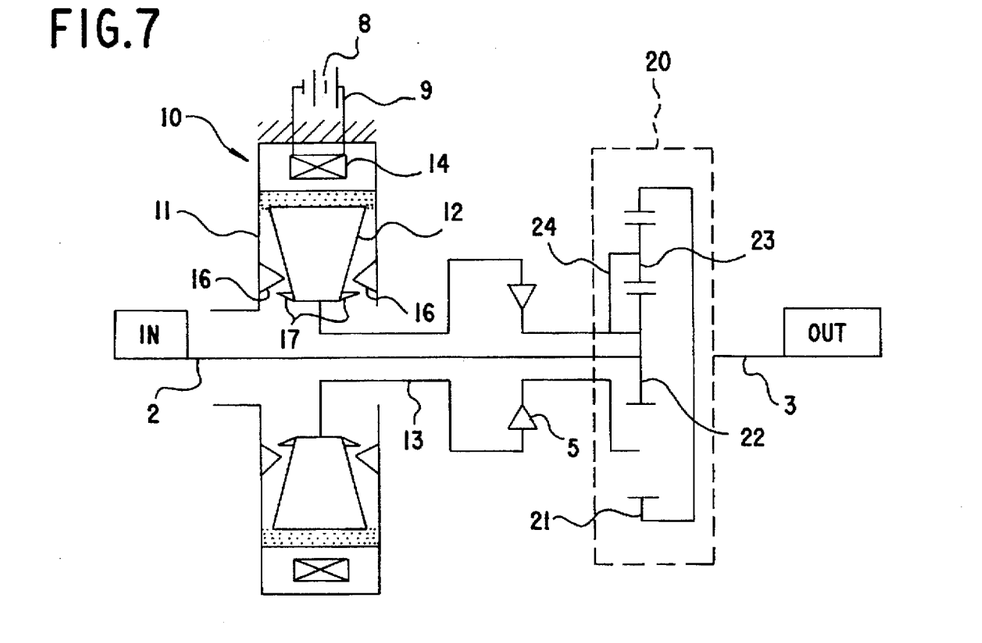
FIG. 7 is a schematic constitutional view of a transmission apparatus according to the fifth embodiment of the invention.

In the fifth embodiment shown in FIG. 7, the sun gear 22 and the ring gear 21 are connected to the input and the output respectively, and the carrier 24 is connected to the rotor 13 through the one-way clutch 5. If the magnetic particle type electromagnetic clutch 10 and the hydraulic clutch have been released from the tight connection, the carrier 24 can rotate freely, rotation of the sun gear 22 is not transmitted to the ring gear 21 because the carrier 24 runs idle and the apparatus is in the neutral state. Then if the magnetic particle type electromagnetic clutch 10 tight-connects, the carrier 24 is prohibited from the reverse rotation and rotation of the sun gear 22 is transmitted to the ring gear 21 through the planetary gear 23 at a reduced speed to bring about the low speed rotation state. And then if the hydraulic clutch tight-connects, the hole planetary gear device 20 rotates in one body to being about the high speed rotation state therein the input and output speeds are the same.

Figure 8:
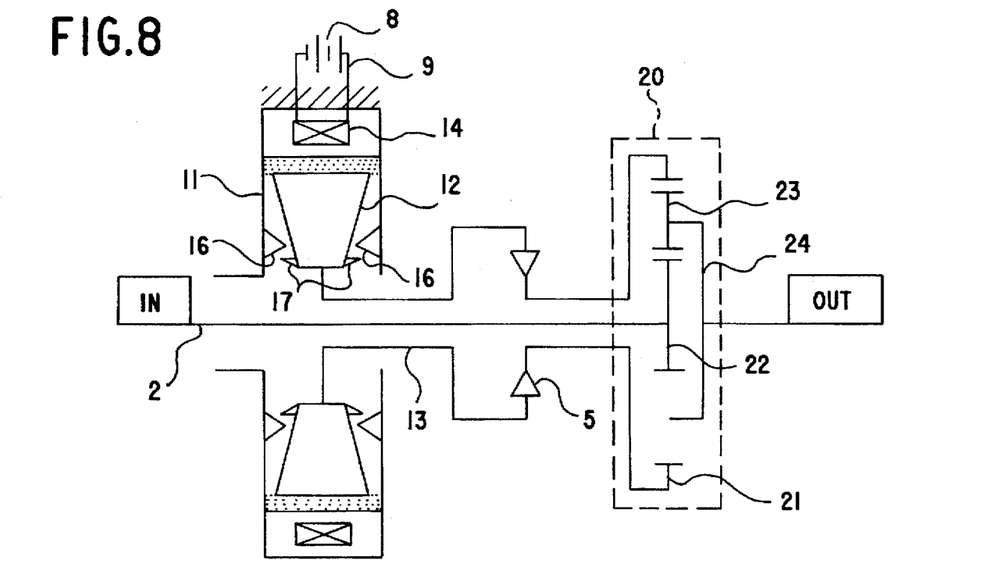
FIG. 8 is a schematic constitutional view of a transmission apparatus according to the sixth embodiment of the invention.

In the sixth embodiment shown in FIG. 8, the sun gear 22 and the carrier 24 are connected to the input and the output respectively, and the ring gear 21 is connected to the rotor 13 through the one-way clutch 5. If the magnetic particle type electromagnetic clutch 10 and the hydraulic clutch have been released from the tight connection, the ring gear 21 can rotate freely, rotation of the sun gear 22 is not transmitted to the carrier because the ring gear 21 runs idle and the apparatus is in the neutral state. Then if the magnetic particle type electromagnetic clutch 10 tight-connects, the ring gear 21 is prohibited from the reverse rotation and rotation of the sun gear 22 is transmitted to the carrier 24 at a reduced speed to bring about the low speed rotation state. And then if the hydraulic clutch tight-connects, the whole planetary gear device 20 rotates in one body to bring about the high speed rotation state wherein the input and output speeds are the same.

In any one of the above examples, the magnetic particle type electromagnetic clutch 10 is used in the state that the outer member 11 is stationary. Accordingly, the exciting coil 14 arranged in the outer member 11 is also stationary so that electric power can be supplied directly from the electric source 8 to the exciting coil 14 by the electric line 9 and sliding electric contact parts such as a slip ring and a brush is not required in the middle of the electric line 9.

When the magnetic particle type electromagnetic clutch is used in a state that the inner member is stationary and the outer member is rotative, the exciting coil is arranged in the inner member side so that no electric contact part is required in the electric power supply passage.

Next, the seventh embodiment which is a modification of the magnetic particle type electromagnetic clutch will be described with reference to FIGS. 9 to 11.

The magnetic particle type electromagnetic clutch 40 of the seventh embodiment has an outer member 41 and an inner member 42 similar to those of the above-mentioned embodiments. The exciting coil 44 is housed within the outer member 41 and the obstruction plates 46, 47 forming electromagnetic powder chambers are similarly provided. But the electromagnetic powder chamber is not divided into small chambers by partition walls.

Along both side edges of the inner circumference of the circumferential wall 21c of the outer member 41 are fitted ring-shaped continuous magnetizing members 48, 49. The magnetizing member may be made of an ordinary magnet, but the magnetizing member made of a resin-rubber series magnet is light in weight and can be attached easily. Further, the magnetizing member may be formed by applying a paint containing powder of a magnetizing material for easy working.

Figure 9:
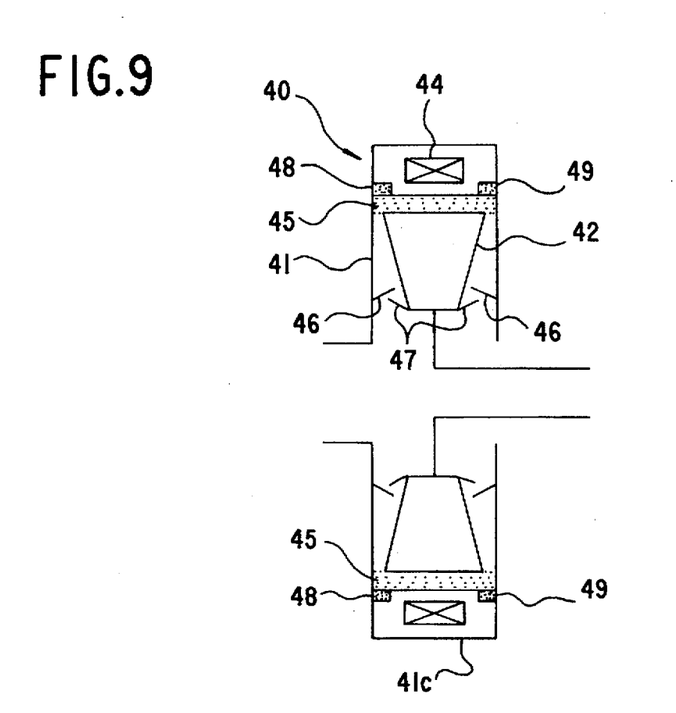
FIG. 9 is a schematic constitutional view of a magnetic particle type electromagnetic clutch according to the seventh embodiment which is in a driven state.

Magnetic force of the magnetizing members 48, 49 is smaller than the magnetic force for magnetizing the magnetic particle of the electromagnetic powder when the exciting coil 14 is electrified to produce the magnetic field, so that the magnetic force of the magnetizing members 48, 49 gives almost no influence on the torque transmission, and as shown in FIG. 9, the electromagnetic powders 45 distribute uniformly on the inner circumference of the circumferential wall 41c of the outer member 4 when the exciting coil 44 is excited.

Figure 10:
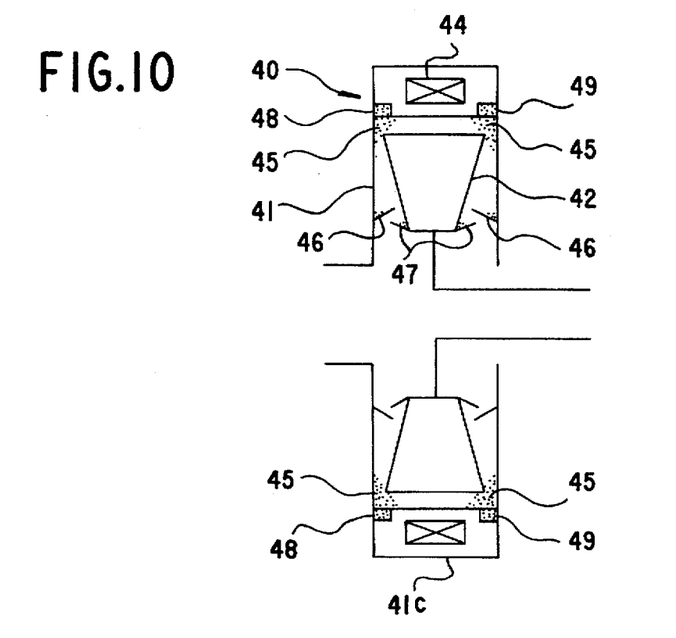
FIG. 10 is a view similar to FIG. 9 showing the stopped state.
Figure 11:
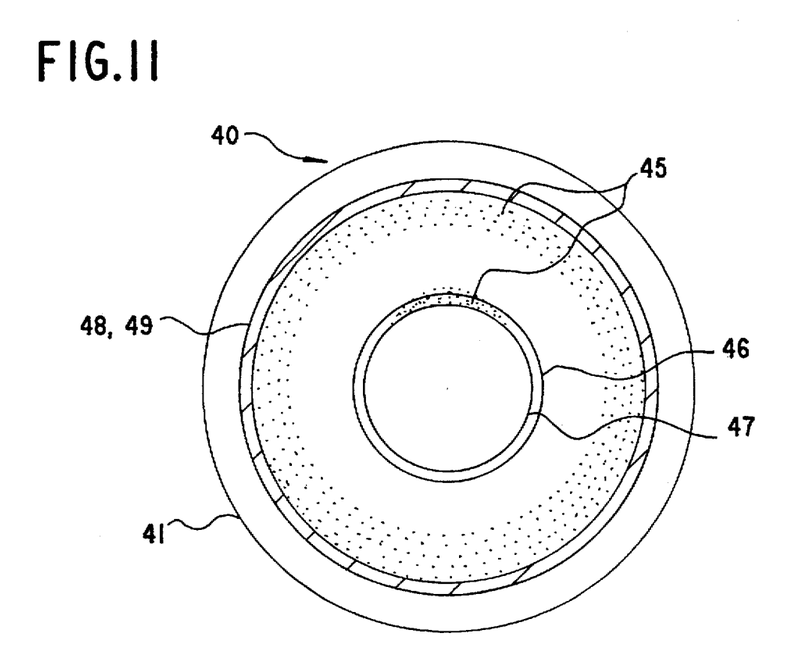
FIG. 11 is a front view of FIG. 10.

When the exciting coil 44 is demagnetized, the magnetizing members 48, 49 attract the electromagnetic powders 45, and as shown in FIGS. 10 and 11, the electromagnetic powders 45 are separated and attracted on the inner circumferences of the ring-shaped magnetizing members 48, 49 to distribute in the circumferential direction without so much deviation. Therefore, rotation can be initiated smoothly on starting, rotational balance can be maintained and a required accurate torque transmission control can be carried out.

Figure 12:
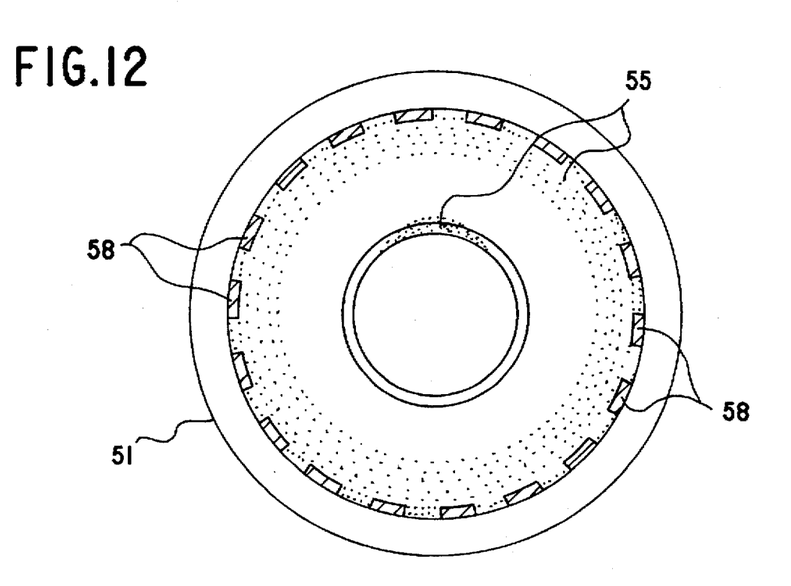
FIG. 12 is a schematic constitutional front view of a magnetic particle type electromagnetic clutch according to the eighth embodiment which is in a stopped state.

Although the magnetizing members 48, 49 in the seventh embodiment are formed continuous in shape of ring, as in the eighth embodiment shown in FIG. 12, a plurality of separated magnetizing members 58 may be arranged at regular intervals along the inner circumference of the outer member 51.

On stopping, each magnetizing member 58 attracts the electromagnetic powder 55, and the powders positioned in recesses between neighboring members 58 are also attracted through the powders 55 directly attracted to the magnetizing members 58 and held on the spot, thus a distribution of the electromagnetic powders 55 similar to the example of FIG. 11 can be realized as shown in FIG. 12.

The above-mentioned magnetizing members may be replaced by electromagnets. In the case that such a electromagnet is used, the electromagnet is not excited when the electromagnetic clutch is driven and excited to attract and hold the electromagnetic powders when the clutch is stopped.

Therefore, there is no influence of magnetic force of the electromagnet on driving and the proper magnetizing of the electromagnetic powders by the exciting for torque transmission and an accurate transmission control can be carried out. Since the magnetic force of the electromagnet is released on starting, the electromagnetic powders are easily stripped and moved into the gap between the circumferential wall of the outer member and the outer circumferential surface of the inner member for torque transmission and a smooth starting is possible.

Figure 13:
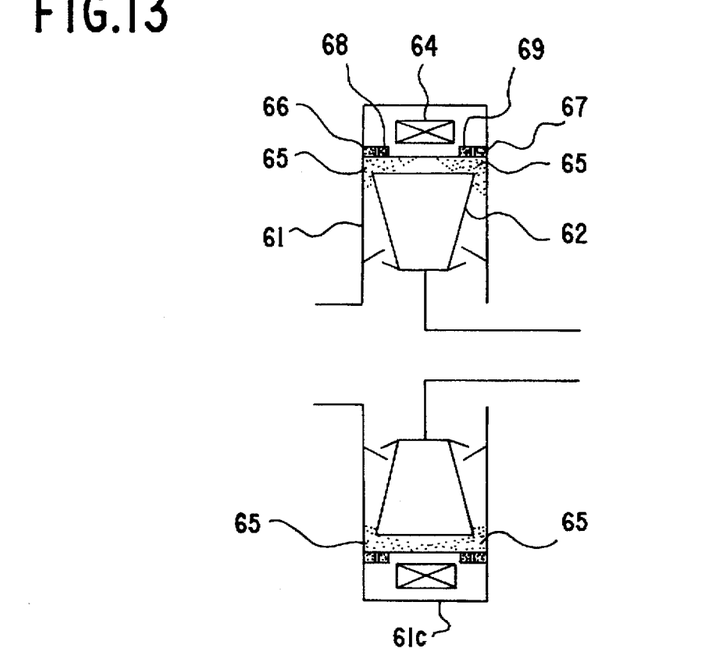
FIG. 13 is a schematic constitutional view of a magnetic particle type electromagnetic clutch according to the ninth embodiment which is in a stopped state.

Further, the ninth embodiment will be described with reference to FIG. 13. This embodiment has the almost same construction as the example shown in FIGS. 9 to 11 in which the magnetizing members 48, 49 are provided on the circumferential wall 41c of the outer member 41. Along both side edges of the inner circumference of a circumferential wall 61c of an outer member 61 covering an inner member 62 are fitted ring-shaped continuous magnetizing members 66, 67, and further, additional ring-shaped continuous magnetizing member 68, 69 are fitted on inner sides of the magnetizing members 66, 67 respectively.

Magnetic force of the magnetizing members 66, 67, 68, 69 on outer and inner sides is smaller than the magnetic force to be obtained by excitation of the exciting coil 64 and magnetic force of the magnetizing member 66, 67 on the outer side smaller than that of the magnetizing member 68, 69 on the inner side.

Accordingly, when torque is transmitted, the electromagnetic powders 65 are not affected so much by the magnetic force of the magnetizing members 66, 67, 68, 69 and magnetized chiefly by the excitation of the exciting coil 64 to be gathered in the gap between the circumferential wall 61c of the outer member 61 and the outer circumferential surface of the inner member 62 so that the torque transmission can be controlled by the excitation of the exciting coil 64. On stopping, the ring-shaped magnetizing members 66, 67, 68, 69 attract the electromagnetic powders 65 on the inner circumferences without so much deviations in the circumferential direction (see FIG. 13).

Therefore, the rotation is initiated smoothly on starting, the rotation balance is maintained and the required accurate torque transmission control can be carried out. When the torque transmission driving is started again, the electromagnetic powders 65 attracted to the outer side magnetizing members 66, 67 are apt to be stripped on excitation of the exciting coil because the magnetic forces of the magnetizing members 66, 67 are small and easily moved to the middle portion of the gap between the circumferential wall 61c of the outer member 61 and the outer circumferential surface of the inner member 62 to contribute to the torque transmission.

Figure 14:
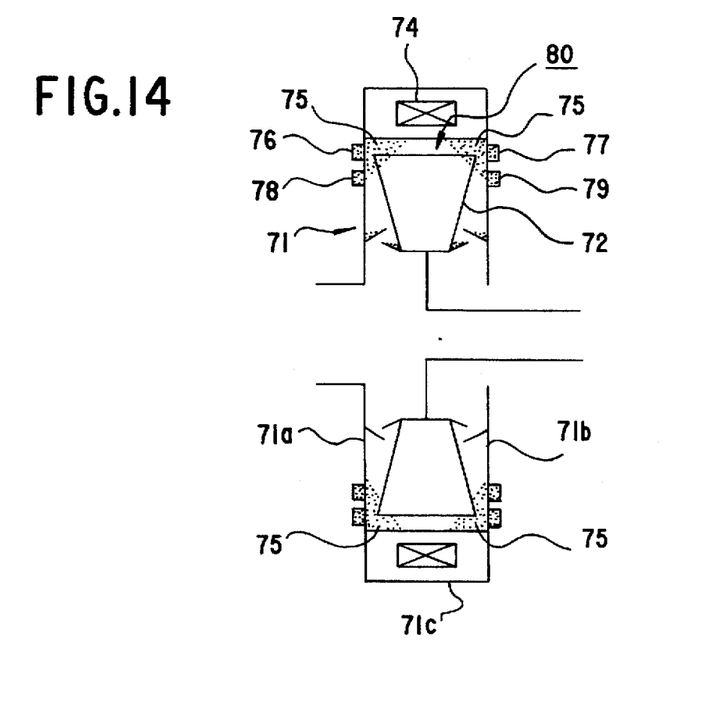
FIG. 14 is a schematic constitutional view of a magnetic particle type electromagnetic clutch according to the tenth embodiment which is in a stopped state.

FIG. 14 shows the tenth embodiment having magnetizing members provided on side walls of an outer member. The exciting coil 74 is housed in the circumferential wall 71c of the outer member 71 covering the inner member 72. On an outer peripheral portions of the side walls 71a, 71b extending along the gap 80 between the circumferential wall 71c and the outer circumference of the inner member 72 are arranged ring-shaped magnetizing members 76, 77 and other ring-shaped magnetizing members 78, 79 of smaller diameter are arranged inside of the members 76, 77.

Magnetic force of the magnetizing members 76, 77, 78, 79 is smaller than magnetic force produced by excitation of the exciting coil 74, and the magnetic force of the inner magnetizing members 78, 79 which is distant from the center of the gap 80 is smaller than the magnetic force of the outer magnetizing members 76, 77 which is near to the center of the gap 80.

Therefore, when torque is transmitted, the electromagnetic powders 65 are not affected so much by the magnetic force of the magnetizing members 76, 77, 78, 79 and magnetized chiefly by the excitation of the exciting coil 74 to be gathered in the gap 80 so that the torque transmission can be controlled by the excitation of the exciting coil 74. On stopping, the ring-shaped magnetizing members 76, 77, 78, 79 attract the electromagnetic powders 75 on the inner surfaces without so much deviation in the circumferential direction (see FIG. 14).

Therefore, the rotation is initiated smoothly on starting, the rotation balance is maintained and the required accurate torque transmission control can be carried out. When the torque transmission driving is started again, the electromagnetic powders 75 attracted to the inner side magnetizing members 78, 79 of smaller diameter are apt to be stripped on excitation of the exciting coil because the magnetic forces of the magnetizing members 78, 79 are small and easily moved to the middle portion of the gap 80 for contribution to the torque transmission and a smooth and sure torque transmission control.

Although the exciting coil is housed in the outer member in the above-mentioned embodiments, the exciting coil may be housed in the inner member which constitutes the stationary side member. Also the magnetizing member or the electromagnet may be provided on the inner member side instead of the outer member side.

In the case that the torque transmission between the outer and inner members is carried out while the outer member rotates, deviation of the electromagnetic powders is dissolved by the rotation of the outer member. However, even if the outer member is fixed, according to the present invention, the electromagnetic powders are not concentrate partially and distributed uniformly in the circumferential direction on stopping, so that inconveniences such that the electromagnetic powders act as resistance on starting or required torque can not be transmitted are dissolved.

Although the above-mentioned ring-shaped magnetizing members and electromagnets are arranged along the inner circumference of the fixed outer member in a circle, even if those are arranged only at an upper side it is possible to prevent the partial concentration of the electromagnetic powders on stopping.

What is claimed is:

1. A power transmission apparatus, comprising:

a planetary gear device having a first gear element connected to an input member for inputting a rotational driving force, a second gear element connected to an output member and a third gear element;

an electromagnetic clutch having a fixed member including an exciting coil, a rotary member connected to said third gear element, and a control means controlling electric energy provided to said exciting coil, wherein said rotary member adapted to be fixed to said fixed member; and clutch means for engaging any two gear elements of said planetary gear device, wherein said third gear element of said planetary gear device is connected to said rotary member through a one-way clutch.

2. A power transmission apparatus as claimed in claim 1, wherein said electromagnetic clutch comprises:

an outer member forming said fixed member having side walls opposite to each other and a circumferential wall covering a periphery of said side walls;

an inner member forming said rotary member provided inside of said outer member rotatably relative to said outer member;

electromagnetic powders interposed between said outer member and said inner member and magnetized by excitation of said exciting coil to form a linkage for connecting said outer member and said inner member;

a ring-shaped chamber disposed on an inner surface of said side wall of said outer member or a side surface of said inner member and having radially outward opening; and a plurality of partition walls circumferentially dividing said electromagnetic powder chamber into a plurality of small chambers.

3. A power transmission apparatus as claimed in claim 1, wherein said electromagnetic clutch comprises an outer member forming said fixed member having side walls opposite to each other and a circumferential wall covering a periphery of said side walls;

an inner member forming said rotary member provided inside of said outer member rotatably relative to said outer member;

electromagnetic powders interposed between said outer member and said inner member and magnetized by excitation of said exciting coil to form a linkage for connecting said outer member and said inner member; and a magnetizing member having a magnetic force weaker than that of said exciting coil and arranged circumferentially on said outer member or said inner member.

4. A power transmission apparatus as claimed in claim 1, wherein said electromagnetic clutch comprises an outer member forming said fixed member having side walls opposite to each other and a circumferential wall covering a periphery of said side walls;

an inner member forming said rotary member provided inside of said outer member rotatably relative to said outer member;

electromagnetic powders interposed between said outer member and said inner member and magnetized by excitation of said exciting coil to form a linkage for connecting said outer member and said inner member;

an electromagnet arranged circumferentially on said outer member or said inner member; and an electromagnet demagnetizing means for demagnetizing said electromagnet when said exciting coil is electrified.

* * * * *